United States Patent Office
2,847,317
Patented Aug. 12, 1958

2,847,317

VANADIUM-BEARING CERAMIC PIGMENT

Thomas D. Carnahan and Edwin H. Ray, Washington, Pa., assignors to B. F. Drakenfeld & Co., Inc., New York, N. Y., a corporation of New York No Drawing. Application July 5, 1956
Serial No. 595,817

12 Claims. (Cl. 106—299)

This invention relates to vanadium-bearing yellow ceramic pigments that are free from defects of those known heretofore, and in particular it is concerned with a method of preparing such pigments, especially vanadium-bearing yellow pigments.

Vitrifiable yellow ceramic pigments containing vanadium are an article of commerce employed for imparting color to ceramic articles. The pigment can be added to the components used in forming the ceramic article, in which case it is known as a body stain, or it can be used on the unfired green ware or on the bisque ware as an underglaze color, or as a color or glaze stain, in the enveloping glaze for the article.

In coloring ceramic articles with vanadium-bearing pigments, such as the well known tin-vanadium yellow pigments, especially where the colorant is employed as a glaze stain or as an underglaze stain, problems are encountered that include welting, dimpling, and a tendency of the glaze to pull away from an underglaze pigment. Welting is a term used to describe a glaze defect which consists of a surface roughness appearing to be a groove or wrinkle in the glaze. Dimples are small crater-like areas in the glaze, often deep enough to expose the ceramic bisque body at the bottom of the crater. These glaze defects result in the rejection of otherwise perfect ceramic articles, with resultant economical loss.

Glaze defects, such as welting, dimpling and pulling away from the area covered by the pigment, are due, as we have found, to the presence of uncombined vanadium (vanadium not combined as a compound with, e. g., tin or zirconium) in the vanadium-bearing pigment. We have found that the most careful leaching of the calcined pigment fails to remove all of the uncombined vanadium that causes the described defects.

It is an object of the present invention to provide a method of preparing vanadium-bearing pigments that can be used to impart color to ceramic articles without resulting in welting, dimpling or separation of a glaze from the decorated ceramic base.

In accordance with this invention, a calcined mixture of vanadium-containing pigment-forming materials is treated by incorporating therein an alkaline reacting metal compound in an amount sufficient to react, in the presence of water, with uncombined vanadium. The thus treated pigment can then be employed in conventional procedures for imparting color to ceramic articles without defects such as welting or dimpling occurring. The invention is further advantageous in that pigment washing may be eliminated, thereby reducing the quantity of materials that need be handled, for by our procedure effects of uncombined vanadium are suppressed without recourse to washing.

Conventional practice of preparing vanadium-bearing ceramic pigments involves forming a mixture of the materials required for the formulation intended, and then calcining it, for example, at a temperature of about 2100° to 2400° F. After the pigment has been calcined, it is water ground in a ball mill and the resultant slurry is passed to a filter press and washed for removal of the soluble salts and water. We have found that no washing within practical limits removes all of the uncombined vanadium, but that it can be rendered impotent to cause welting or dimpling by treating the calcine in water with an alkaline reacting metal compound.

In practicing our invention, the alkaline reacting metal compound can be incorporated in the pigment at any point in the process after calcination has been accomplished. We have added the alkaline compound to the calcined mixture both prior to grinding and after it has been ground and slurried, with satisfactory results in each instance. Where the reaction of the alkaline metal compound with uncombined vanadium produces carbon dioxide, we prefer to make the addition to the ground slurry because the reaction in the air-tight ball mills used for such purposes may build up pressures that are dangerous, thereby requiring precautions to avoid explosion. Where the reaction of one alkaline compound with uncombnied vandium does not release carbon dioxide, the alkaline reacting metal compound can be introduced either in the ball mill or in the slurry that is recovered from the mill. If desired, the calcine may first be ground, slurried, filtered and washed to dispose of most of the uncombined vanadium. Then, after reslurrying the pigment, the alkaline reacting metal compound may be added to the slurry to remove the remaining uncombined vanadium. This alternate procedure, though requiring the handling of the calcine for a plurality of steps, may be particularly advantageous where it is desired to minimize the quantity of alkaline reacting compound that is to be used.

Upon the introduction of the alkaline reacting metal compound into the calcined pigment it reacts, in the presence of water, with, as we now believe, the uncombined vanadium that is present to form an insoluble vanadate, thereby eliminating the sources of the undesirable characteristics encountered with unmodified vanadium yellow pigments. Heating and agitating the mixture can be used advantageously to accelerate the reaction of the alkaline compound with uncombined vanadium, but the reaction is not dependent on such factors.

In the present invention the alkaline reacting metal compound is employed in an amount sufficient to react with the uncombined vanadium which is present in the calcined pigment. In the instance of yellow pigments, such as tin vanadium yellows, zirconium vanadium yellows, and tin vanadium titanium yellows, the quantity of alkaline compound to be added can be determined simply by incorporating it incrementally in the pigment slurry and stirring until all the vanadium is combined. This point may be determined by filtering samples of the slurry and noting at which increment addition of alkaline compound all yellow coloration in the filtrate disappears. For most commercial formulations about 3 to 10 percent of the alkaline compound, based on the dry weight of the pigment, will be satisfactory.

Typical alkaline reacting metal compounds useful for the purposes of the invention are, by way of example, salts and hydroxides of sodium, potassium, lithium, magnesium, calcium, barium, zinc, strontium, and mixtures of them. The carbonates and hydroxides are preferred for economic reasons. Salts and hydroxides of iron, cobalt, nickel and the like may be used but in general they will contribute some color other than yellow to the finished pigment and for most purposes they are thus less desirable.

The invention will be illustrated by the following examples.

*Example I*

To produce a tin vanadium yellow pigment, a mixture containing 10 parts by weight of tin oxide ($SnO_2$) for each part of ammonium vanadate ($NH_4VO_3$) was calcined at a temperature of about 2300° to 2400° F. The theoretical composition of the resultant calcined mass was, by weight, 94.5 percent $SnO_2$ and 5.5 percent $V_2O_5$. The calcine was ground, in a ball mill, in water to suitable fineness and the resultant slurry was pumped to a filter press and filtered to remove the water and most of the uncombined vanadium. The pigment remaining in the filter press was washed with hot water to remove as much of the remaining uncombined vanadium as possible, whereupon it was dried.

The dried pigment, at additions of one, two and six weight percent, was tested as a glaze stain in several standard glazes, covering a temperature range of 2000° F. to 2300° F. In all glazes there was evidence of dimpling, and it occurred to a greater extent at the six percent addition than at additions of one or two percent. There was no sign of welting in any of the glazes. The pigment was also tested as an underglaze stain. A very bad welting condition resulted throughout the article, and in some spots the glaze pulled away completely from the area covered by the pigment. These poor results, characteristic of prior yellows of this type, occurred notwithstanding efforts to remove the uncombined vanadium by thoroughly washing the pigment.

Example II

A tin vanadium yellow calcine, prepared by the procedure of Example I to be of the same composition, was ground in water in a ball mill to suitable fineness. An addition of 6 percent of magnesium carbonate, based on the dry weight of the calcine, was mixed with the slurry and the slurry was then heated to about 150° F. to accelerate the reaction. When reaction ceased, as evidenced by cessation of the bubble action of escaping carbon dioxide, the pigment was filtered and then dried.

The finished pigment was tested in the same manner as described for the pigment of Example I. Neither as a glaze stain nor as an underglaze stain were any welts or dimples evident. It is to be noted that these fine results were achieved even though the pigment was not washed, as was done in Example I.

An equally effective procedure of practicing our invention involves adding the alkaline reacting metal compound to the calcined pigment and grinding the resultant mixture. This procedure is shown in Example III.

Example III

A tin vanadium yellow calcine, having a theoretical composition, by weight, of 94.5 percent $SnO_2$ and 5.5 percent $V_2O_5$, was charged into a grinding mill with sufficient water for proper grinding. An addition of 4 percent of magnesium hydroxide, based on the dry weight of the pigment, was also charged into the mill and the resulting mixture was ground to suitable fineness. The pigment was filtered from the water, and it was noted that there was no coloration to the filtrate thereby indicating that no uncombined vanadium remained. The pigment was dried and tested on a schedule similar to that in Example I. When used as a glaze stain, the pigment did not contribute any glaze welting, and, when used as an underglaze stain, it did not cause any glaze pullback from the pigment.

Example IV

A zirconium vanadium yellow calcine, having a theoretical composition of 89.0 percent $ZrO_2$, 3.7 percent $SiO_2$ and 7.3 percent $V_2O_5$, was charged to a grinding mill and ground in water to suitable fineness. The resulting slurry was filtered to remove the water and most of the uncombined vanadium. The pigment remaining in the filter was washed with hot water to remove as much of the remaining uncombined vanadium as possible. The pigment was dried and then tested on a schedule similar to that of Example I. When used as a glaze stain, the resultant glazes exhibited some dimpling at the six percent pigment addition. Commercial reports on a stain of this type indicate that it does not contribute much dimpling to the glaze when used as a glaze stain. When the pigment was tested as an underglaze, however, welting was serious though not as extensive as that which occurred in testing the pigment of Example I.

Example V

A zirconium vanadium yellow calcine, prepared to be of the same composition as that of Example IV, was charged to a grinding mill and ground in water to suitable fineness. An addition of 4 percent of lithium carbonate, based on the dry weight of the pigment, was mixed into the resultant slurry and the slurry was then heated to about 150° F. to accelerate the reaction. When bubble action ceased, the pigment was filtered from the water and dried. The pigment was tested as outlined in Example I; no defects due to soluble vanadium could be detected.

Examples II and III, when compared with Example I, demonstrate that the present invention is an effective method of preparing a pigment so that the resultant pigment, upon use as a ceramic colorant, will not contribute such defects as welting and dimpling. Even in the instance of a defect-resistant pigment such as virconium vanadium yellow, improvement in its resistance is achieved by our method as is shown by comparing Example V with Example IV. While the invention has been described with particular reference to vanadium-bearing yellows, it may be used with any vanadium-containing pigment.

In accordance with the provisions of the patent statutes, we have explained the principle of our invention and have described what we now believe to be its best embodiment. However, we desire to have it understood that, within the scope of the appended claims, the invention may be practiced otherwise than as specifically described.

We claim:

1. In a method of preparing a vanadium-bearing pigment for coloring ceramic articles where a mixture of pigment-forming materials in amounts to form a pigment and including a vanadium compound is calcined and produces a calcined pigment containing an uncombined oxide of vanadium, and the resultant calcined pigment is ground in water and filtered, that step comprising incorporating in said calcined pigment an alkaline-reacting metal compound in an amount sufficient to react completely, in the presence of water, with said uncombined vanadium oxide in said calcine.

2. In a method of preparing a vanadium-bearing yellow pigment selected from the group consisting of tin vanadium yellow, zirconium vanadium yellow and tin titanium vanadium yellow, wherein a mixture of pigment-forming materials in amounts to form a pigment and including a vanadium compound is calcined and produces a calcined pigment containing an uncombined oxide of vanadium, and the resultant calcined pigment is ground in water and filtered, that step comprising incorporating in said calcined pigment an alkaline-reacting metal compound in an amount sufficient to react completely, in the presence of water, with said uncombined vanadium oxide in said pigment.

3. A method according to claim 1 in which said alkaline-compound is employed in an amount of 3 to 10 percent, based on the dry weight of said calcined pigment.

4. A method according to claim 1 in which said alkaline-reacting metal compound is incorporated in said calcined pigment prior to the slurrying thereof.

5. A method according to claim 1 in which said alkaline-reacting metal compound is incorporated in the pigment slurry resulting upon grinding said pigment in water.

6. In a method of preparing a tin vanadium yellow pigment where a mixture of oxidic compounds of tin and vanadium in amounts to form a pigment is calcined and produces a calcined pigment containing an uncombined oxide of vanadium, and the resultant calcined pigment is ground in water and filtered, that step comprising incorporating in said calcined pigment an alkaline-reacting metal compound in an amount sufficient to react completely, in the presence of water, with said uncombined vanadium oxide in said calcine.

7. A method according to claim 6 in which said alkaline-reacting metal compound is employed in an amount of about 3 to 10 percent, based on the dry weight of said calcined pigment.

8. A method according to claim 7 in which said alkaline-reacting compound is magnesium hydroxide.

9. A method according to claim 7 in which said alkaline-reacting compound is magnesium carbonate.

10. In a method of preparing a zirconium vanadium yellow pigment where a mixture of oxidic compounds of zirconium in amounts to form a pigment is calcined and produces a calcined pigment containing an uncombined oxide of vanadium, and the resultant calcined pigment is ground in water and filtered, that step comprising incorporating in said calcined pigment an alkaline-reacting metal compound in an amount sufficient to react completely, in the presence of water, with said uncombined vanadium oxide therein.

11. A method according to claim 10, in which said alkaline-reacting metal compound is employed in an amount of about 3 to 10 percent, based on the dry weight of said calcined pigment.

12. A method according to claim 11 in which said alkaline-reacting compound is lithium carbonate.

References Cited in the file of this patent

UNITED STATES PATENTS

| | | |
|---|---|---|
| 828,850 | Hayes | Aug. 14, 1905 |
| 1,065,581 | Bleecker | June 24, 1913 |
| 1,945,611 | Knight et al. | Feb. 6, 1934 |
| 2,298,091 | Cooper et al. | Oct. 6, 1942 |
| 2,372,367 | Depew | Mar. 27, 1945 |
| 2,441,447 | Sealright | May 11, 1948 |
| 2,438,335 | Earl | Mar. 23, 1948 |

FOREIGN PATENTS

| | | |
|---|---|---|
| 554,607 | Germany | July 11, 1932 |
| 384,473 | Great Britain | Dec. 8, 1932 |

UNITED STATES PATENT OFFICE
CERTIFICATE OF CORRECTION

Patent No. 2,847,317                                August 12, 1958

Thomas D. Carnahan et al.

It is hereby certified that error appears in the printed specification of the above numbered patent requiring correction and that the said Letters Patent should read as corrected below.

Column 2, line 19, for "one" read -- the --; line 20, for "combnied" read -- combined --; column 5, line 21, after "zirconium" insert -- and vanadium --.

Signed and sealed this 18th day of November 1958.

(SEAL)
Attest:
KARL H. AXLINE
Attesting Officer

ROBERT C. WATSON
Commissioner of Patents